United States Patent
English et al.

(10) Patent No.: US 9,490,659 B1
(45) Date of Patent: Nov. 8, 2016

(54) PORTABLE PHOTOVOLTAIC ELECTRIC POWER SYSTEM WITH EXTENDABLE CORDS

(71) Applicants: Edwin A. English, Peoria, AZ (US); Janet G. Gutierrez, Peoria, AZ (US)

(72) Inventors: Edwin A. English, Peoria, AZ (US); Janet G. Gutierrez, Peoria, AZ (US)

(*) Notice: Subject to any disclaimer, the term of this patent is extended or adjusted under 35 U.S.C. 154(b) by 155 days.

(21) Appl. No.: 14/453,195

(22) Filed: Aug. 6, 2014

Related U.S. Application Data (60) Provisional application No. 61/946,073, filed on Feb. 28, 2014.

(51) Int. Cl.
*H02J 7/35* (2006.01)
*H02J 7/00* (2006.01)

(52) U.S. Cl.
CPC .............. *H02J 7/355* (2013.01); *H02J 7/007* (2013.01); *H02J 7/0045* (2013.01); *H02J 7/0047* (2013.01)

(58) Field of Classification Search
CPC ...................................................... Y02E 10/50
See application file for complete search history.

(56) References Cited

U.S. PATENT DOCUMENTS

| | | | |
|---|---|---|---|
| 2,112,821 A | 3/1938 | Wolters | |
| 4,073,386 A * | 2/1978 | DeNomme | B66F 9/06 414/20 |
| 4,248,294 A | 2/1981 | Budzynski et al. | |
| 4,261,333 A | 4/1981 | Guarnaschelli | |
| 4,421,943 A * | 12/1983 | Withjack | F24J 2/5264 126/569 |
| 4,505,261 A | 3/1985 | Hunter | |
| 4,615,329 A | 10/1986 | Takeuchi et al. | |
| 4,766,885 A | 8/1988 | Muramatsu | |
| 5,522,943 A * | 6/1996 | Spencer | H01L 31/042 136/245 |
| 6,014,968 A | 1/2000 | Teoh | |
| 6,119,682 A | 9/2000 | Hazan | |
| 6,814,070 B2 | 11/2004 | Bourne et al. | |
| 7,793,467 B1 * | 9/2010 | Melton | E04H 5/04 52/173.3 |
| 7,795,837 B1 * | 9/2010 | Haun | H01M 10/441 136/244 |
| 8,203,237 B1 * | 6/2012 | Cowles | H02J 7/355 307/150 |
| 2003/0058601 A1 * | 3/2003 | Hunter | A45C 3/02 361/118 |
| 2006/0225781 A1 * | 10/2006 | Locher | H01L 31/02 136/245 |
| 2007/0034622 A1 * | 2/2007 | Ruminski | B60N 3/048 219/528 |
| 2009/0038673 A1 * | 2/2009 | Ware | H01L 31/048 136/246 |
| 2009/0039705 A1 * | 2/2009 | Lyman | H01M 2/1022 307/64 |
| 2010/0045237 A1 * | 2/2010 | Liu | H02J 7/04 320/128 |

(Continued)

OTHER PUBLICATIONS http://www.jetsongreen.com/2011/09/solimpeks-hybrid-solar-pv-thermal-panel.html (Sep. 12, 2011).
http://inhabitat.com/photovoltaic-solar-hot-water-panels-reap-multiple-benefits/.

*Primary Examiner* — Drew A Dunn
*Assistant Examiner* — Tynese McDaniel
(74) *Attorney, Agent, or Firm* — Robert C. Montgomery; Montgomery Patent & Design (57) ABSTRACT

A portable photovoltaic electrical power system includes a photovoltaic panel, a battery bank electrically connected to the photovoltaic panel, a 12-VDC retractable power cord electrically connected to the battery bank, and a 120-VAC retractable power cord electrically connected to the battery bank.

17 Claims, 3 Drawing Sheets

(56) References Cited

U.S. PATENT DOCUMENTS

| | | | | |
|---|---|---|---|---|
| 2011/0005576 A1* | 1/2011 | Bullen | | H01L 31/052 136/246 |
| 2011/0273130 A1* | 11/2011 | Lee | | H01M 10/465 320/101 |
| 2012/0112544 A1* | 5/2012 | Salcone | | H02J 7/0047 307/65 |
| 2012/0279493 A1 | 11/2012 | Dotan | | |
| 2012/0299533 A1* | 11/2012 | Huffman | | H02J 7/0013 320/107 |
| 2012/0318328 A1 | 12/2012 | Boyle et al. | | |
| 2013/0087184 A1 | 4/2013 | Tran et al. | | |
| 2013/0106353 A1* | 5/2013 | Foster | | H02J 7/0044 320/114 |
| 2013/0257346 A1* | 10/2013 | Jakins | | H02J 7/355 320/107 |
| 2014/0028242 A1* | 1/2014 | Akin | | H02J 7/35 320/101 |
| 2014/0097786 A1* | 4/2014 | Grimes | | H02S 10/30 320/101 |

* cited by examiner

PORTABLE PHOTOVOLTAIC ELECTRIC POWER SYSTEM WITH EXTENDABLE CORDS

RELATED APPLICATIONS

The present invention was first described in and claims the benefit of U.S. Provisional Application No. 61/946,073, filed Feb. 28, 2014, the entire disclosures of which are incorporated herein by reference.

FIELD OF THE INVENTION

The present invention relates generally to solar power generation and, more particularly, to a hybrid-charging device including a solar cell panel, a battery, a power inverter, a converter, a casing, and an automatic reel storing a power cord.

BACKGROUND OF THE INVENTION

Gasoline powered electrical generators provide electricity in a wide range of locations under a wide range of conditions. They are ideal for running appliances, tools, lights, and even entertainment devices during a commercial power outage. They can also be used to provide power for tools at remote locations, or for providing power while camping.

However, as versatile as generators are, they are not without their disadvantages. First, they consume gasoline, a limited resource. Second, they produce hazardous exhaust, thus polluting the environment, and requiring them to be used only outside. Finally, and perhaps most important, they produce an inordinate noise, which prohibits their use under most residential conditions, and most campsites under night-time hours.

Accordingly, there exists a need for a means to provide clean, uninterruptible power virtually anywhere, without the noise or inconvenience of gasoline powered generators.

SUMMARY OF THE INVENTION

The inventor has recognized the aforementioned inherent problems and lack in the art and observed that there is a need for a portable photovoltaic electrical power system with extendable cords. The development of the present invention, which will be described in greater detail herein, substantially departs from conventional solutions to fulfill this need.

In one embodiment, the disclosed portable photovoltaic electrical power system includes a photovoltaic panel, a battery bank electrically connected to the photovoltaic panel, and a 12-VDC retractable power cord electrically connected to the battery bank.

In another embodiment, the disclosed portable photovoltaic electrical power system includes a photovoltaic panel, a battery bank electrically connected to the photovoltaic panel, and a 120-VAC retractable power cord electrically connected to the battery bank.

In yet another embodiment, the disclosed portable photovoltaic electrical power system includes an exterior case including a front surface and an opposed rear surface and defining an internal space. The system includes a handle connected to an upper end of the exterior case. The system includes a photovoltaic panel defining substantially all of the front surface. The system includes an auxiliary 12-VDC charging port. The system includes a plurality of support feet connected to a lower end of the exterior case to orient the photovoltaic panel in a substantially vertical position. The system includes a plurality of bumpers connected to the back surface to orient the photovoltaic panel in a substantially horizontal position. The system includes a leg pivotably connected to the back surface to orient the photovoltaic panel at a non-zero angle relative to vertical. The system includes a battery bank including a plurality of lithium ion storage batteries electrically connected to the photovoltaic panel and the auxiliary 12-VDC charging port. The system includes a first spring load reel with slip rings operatively connected to the exterior case within the internal space and electrically connected to the battery bank, the photovoltaic panel, and the auxiliary 12-VDC charging port. The system includes a second spring load reel with slip rings operatively connected to the exterior case within the internal space and electrically connected to the battery bank, the photovoltaic panel, and the auxiliary 12-VDC charging port. The system includes a 12-VDC retractable power cord electrically connected to the first spring load reel with slip rings and wound around the first spring load reel with slip rings, the 12-VDC retractable cord including a 12-VDC power plug. The system includes a 120-VAC retractable power cord electrically connected to the second spring load reel with slip rings and wound around the second spring load reel with slip rings, the 120-VAC retractable cord including a 120-VAC power plug. The system includes a step up transformer electrically interconnected between: (1) the photovoltaic panel and the battery bank (2) the photovoltaic panel and the first spring load reel with slip rings; and (3) the photovoltaic panel and the second spring load reel with slip rings. The system includes a charge controller board electrically interconnected between: (1) the step up transformer and the battery bank, (2) the step up transformer and the first spring load reel with slip rings, (3) the step up transformer and the second spring load reel with slip rings, (4) the auxiliary 12-VDC charging port and the first spring load reel with slip rings, and (5) the auxiliary 12-VDC charging port and the second spring load reel with slip rings. The system includes a charge indicator light electrically connected to the charge controller. The system includes an inverter board electrically interconnected between the battery bank and the second spring load reel with slip rings. The system includes a blocking diode electrically interconnected between the photovoltaic panel and the auxiliary 12-VDC charging port. The system includes a 12-VDC control switch electrically interconnected between the battery bank and the first spring load reel with slip rings. The system includes a 120-VAC control switch electrically interconnected between the battery bank and the second spring load reel with slip rings. The system includes a low voltage adapter removably electrically connected to the 12-VDC power plug. The low voltage adapter includes a central case enclosure, a solid state voltage reduction circuit, and a plurality of output cables. Each output cable includes a low voltage connector.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 portable photovoltaic electrical power system
15 exterior case
16 internal space
17 bumper
18 leg
20 carrying handle
25 support feet
30 photovoltaic panel
31 step-up-transformer
35 120-VAC retractable power cord
40 12-VDC retractable power cord
42 solid state voltage reduction circuit
45 spring load reel with slip rings
45a first spring loaded reel with slip rings
45b second spring loaded reel with slip rings
50 120-VAC power plug
55 12-VDC power plug
60 rear surface
65 charge indicator light
70 auxiliary 12-VDC charging input port
75 12-VDC control switch
80 120-VAC control switch
85 lithium ion storage batteries
90 charge controller board
95 inverter board
100 low voltage adapter
105 central case enclosure
110 12-VDC input connector
115 first output cable
120 second output cable
125 third output cable
130 fourth output cable
135 blocking diode

DETAILED DESCRIPTION OF THE PREFERRED EMBODIMENT

In accordance with the invention, the best mode is presented in terms of a one or more of the disclosed embodiments, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring to FIGS. 1-5, disclosing a portable photovoltaic electrical power system with extendable cords (herein described as the "system") 10, where like reference numerals represent similar or like parts.

Figure 1:
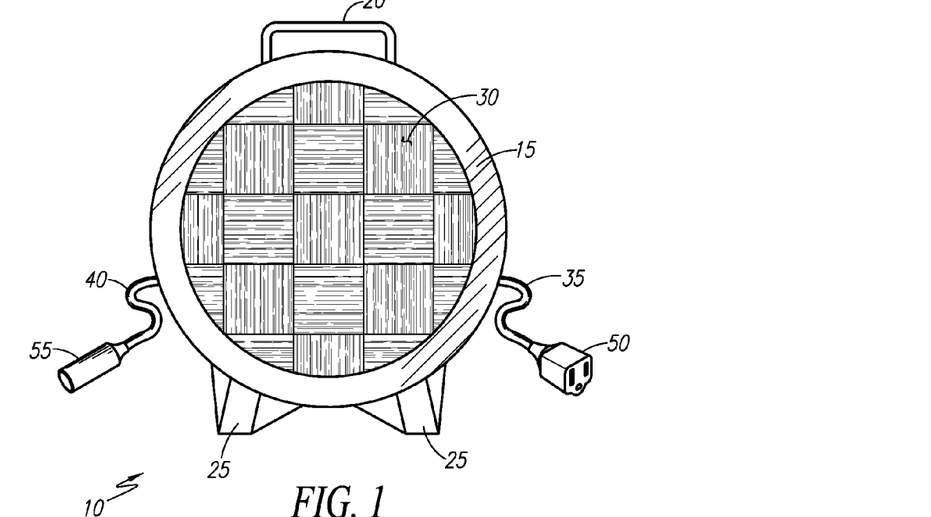
FIG. 1 is a front view of one embodiment of the disclosed portable photovoltaic electrical power system with extendable cords.
Figure 2:
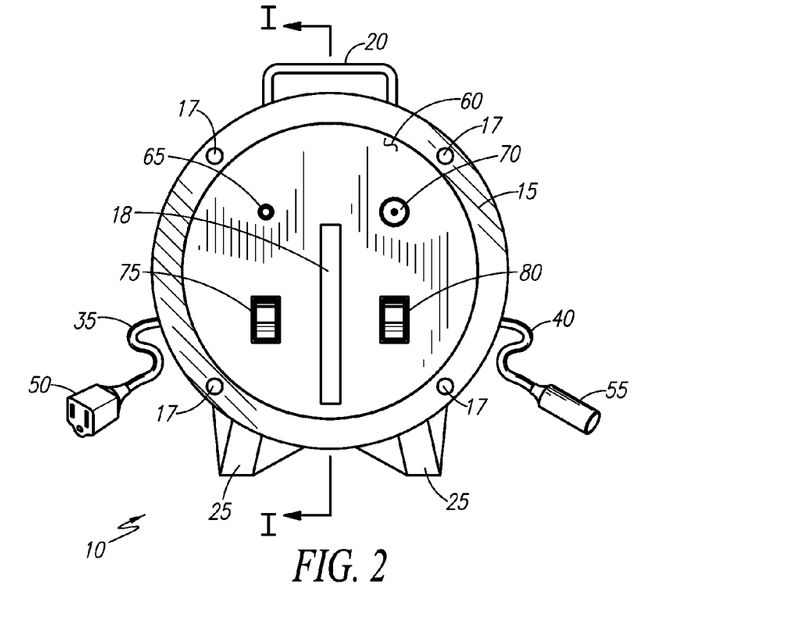
FIG. 2 is a rear view of the portable photovoltaic electrical power system with extendable cords.

Referring to FIGS. 1 and 2, in one embodiment, the system 10 includes (e.g., is housed in) an exterior case 15. The exterior case 15 includes a front surface and an opposed rear surface and defines an internal space 16. The exterior case 15 includes a carrying handle 20 and support feet 25. The exterior case 15 also includes a plurality of rubber hemispherical bumpers 17 connected or otherwise disposed along a back perimeter edge. The bumpers 17 enable the system 10 to lie upon a rear surface. The exterior case 15 also includes a swing-out leg 18 along the rear surface that pivots outwardly to allow the system 10 to lean back and be supported at a non-zero angle, for example, approximately forty-five degrees (45°).

While the exact size of the exterior case 15 will vary per the electrical capacity of the system 10, in an example construction, the exterior case 15 can be approximately twelve inches (12 in.) in diameter and four inches (4 in.) thick.

The front of the exterior case 15 includes with a photovoltaic panel 30 that covers the majority of the front surface. The photovoltaic panel 30 includes a standard design with parallel and/or series connections to produce voltage and current. During use of the system with 10, the exterior case 15 is adjusted and angled to produce the maximum exposure of sunlight and/or other light sources onto the photovoltaic panel 30.

The system 10 includes a 120-VAC retractable power cord 35 and a 12-VDC retractable power cord 40, for example on each lower side (e.g., a first side and an opposing second side) of the exterior case 15. Both the 120-VAC retractable power cord 35 and the 12-VDC retractable power cord 40 provide electrical connection to the output power provides by the system 10. The 120-VAC retractable power cord 35 and the 12-VDC retractable power cord 40 can be used (e.g., provide functional electricity) in an individual or simultaneous manner.

In an example construction, the total length of each of the 120-VAC retractable power cord 35 and/or the 12-VDC retractable power cord 40 can be approximately twenty-five feet (25 ft.) each. This separation distance allows for usage when the photovoltaic panel 30 must remain in a highly illuminated location while the electrical load to be serviced remains a distance away up to twenty-five feet (25 ft.).

Figure 3:
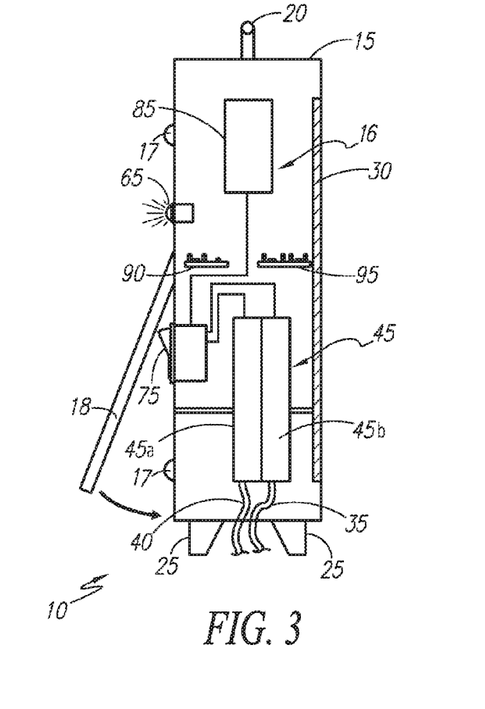
FIG. 3 is a sectional view of the portable photovoltaic electrical power system with extendable cords as seen along a line I-I of FIG. 2.

Referring to FIGS. 1-3, the 120-VAC retractable power cord 35 and the 12-VDC retractable power cord 40 are each connected to a spring load reel with slip rings 45 of the standard design. The spring load reel with slip rings 45 provides for automatic extension and retraction of the respective 120-VAC retractable power cord 35 and the 12-VDC retractable power cord 40. As an example, the system 10 includes a first spring load reel with slip rings 45a operatively connected to the exterior case 15 within the internal space 16 and electrically connected to the battery bank 85 (e.g., internal lithium ion storage batteries), the photovoltaic panel 30, and the auxiliary 12-VDC charging port 70 and a second spring load reel with slip rings 45b operatively connected to the exterior case 15 within the internal space 16 and electrically connected to the battery bank 85, the photovoltaic panel 30, and the auxiliary 12-VDC charging port 70. The 12-VDC retractable power cord 40 is electrically connected to the first spring load reel with slip rings 45a and wound around the first spring load reel with slip rings 45a. The 12-VDC retractable cord 40 includes the 12-VDC power plug 55. The 120-VAC retractable power cord 35 is electrically connected to the second spring load reel with slip rings 45b and wound around the second spring load reel with slip rings 45b. The 120-VAC retractable cord 35 includes the 120-VAC power plug 50.

Referring to FIGS. 1 and 2, the 120 VAC retractable power cord 35 includes a 120-VAC power plug 50. The 12-VDC retractable power cord 40 includes a 12-VDC power plug 55. Both the 120-VAC power plug 50 and the 12-VDC power plug 55 are known in the art and provide typical power supply capabilities as would be found in a conventional residence or motor vehicle, respectively.

Referring to FIG. 2, a rear surface 60 of the exterior case 15 includes a charge indicator light 65, an auxiliary 12-VDC charging input port 70, a 12-VDC control switch 75, and a 120-VAC control switch 80.

Referring to FIG. 3, the charge indicator light 65 is used to display the state of charge of an internal lithium ion storage batteries 85 (e.g., battery bank). The lithium ion storage batteries 85 are used to store excess power as generated by the photovoltaic panel 30 (FIG. 1) and provide power when the output of the photovoltaic panel 30 is not adequate for the power load present.

Referring to FIGS. 2 and 3, the auxiliary 12-VDC charging input port 70 is used to charge the lithium ion storage batteries 85 from alternate sources when the output of the photovoltaic panel 30 is inadequate. For example, power sources include, but are not limited to, a wall charger that produces 12 VDC through a wall mounted power adapter, a 12-VDC power cord that is connected to the cigarette lighter on a motor vehicle, and the like.

The 12-VDC control switch 75 is used to turn power ON and OFF to the 12-VDC retractable power cord 40 to allow the system 10 to control power usage without continually having to manually disconnect the loads from the 12-VDC power plug 55. The 120-VAC control switch 80 is used to turn power ON and OFF to the 120-VAC retractable power cord 35 to allow the system 10 to control power usage without continually having to manually disconnect the loads from the 120-VAC power plug 50.

Referring to FIG. 3, in an example construction, the exterior case 15, the carrying handle 20, and the support feet 25 can be made of heavy duty impact resistant plastic, for example, in an injection molding process. The interior components of the photovoltaic panel 30, the charge indicator light 65, and the auxiliary 12-VDC charging input port 70 are mounted on exterior of the exterior case 15, for example, as depicted in example positions in FIGS. 2 and 3.

As an example, the lithium ion storage batteries 85 are located in the upper half of the exterior case 15. The spring load reel with slip rings 45 for the 120-VAC retractable power cord 35 (FIG. 2) is located in the lower half of the exterior case 15. A charge controller board 90 and an inverter board 95 are located at the midpoint of the exterior case 15.

The charge controller board 90 is used to control electrical power as provided to the lithium ion storage batteries 85 to prevent overcharging and premature failure of the lithium ion storage batteries 85. The inverter board 95 is used to produce 120-VAC power from the lithium ion storage batteries 85 that is then subsequently delivered by the 120-VAC retractable power cord 35 (FIG. 2).

Figure 4:
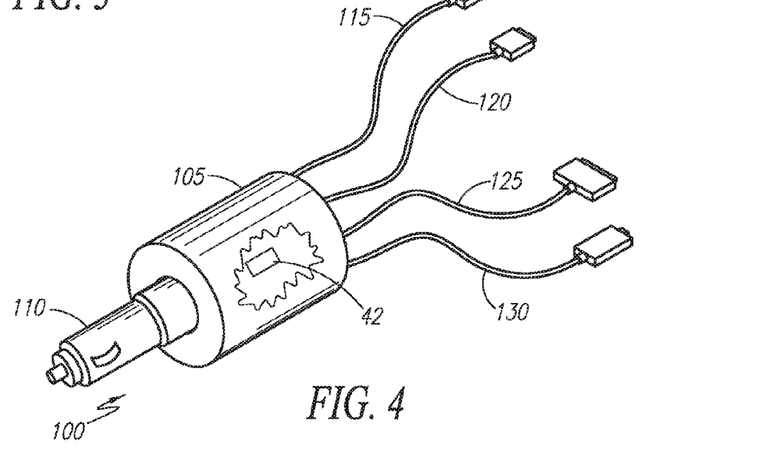
FIG. 4 is a perspective view of one embodiment of the low voltage adapter used with the portable photovoltaic electrical power system with extendable cords; and, FIG. 5 is a schematic electrical block diagram of the portable photovoltaic electrical power system with extendable cords.

Referring next to FIG. 4, in another embodiment, the system 10 includes a low voltage adapter 100. The low voltage adapter 100 is used to produce alternate voltage levels (e.g., 5.0-VDC) for use with small electronics from the 12-VDC retractable power cord 40.

In an example construction, the low voltage adapter 100 includes a central case enclosure 105. The central case enclosure 105 can have the approximate dimensions of three inches (3 in.) long and two inches (2 in.) in diameter. The interior of the central case enclosure 105 houses a solid state voltage reduction circuit 42 that reduces the 12-VDC to a desired and/or variable output voltages. Such circuits are known in the art and can take on multiple formats and, as such, no particular format is intended to be a limiting factor.

Referring to FIGS. 1 and 4, input power to the low voltage adapter 100 is provided by a 12-VDC input connector 110. The format of the 12-VDC input connector 110 is that which will mate with the 12-VDC power plug 55. As a non-limiting example, and as illustrated in FIG. 4, a standard cigarette power connection can be used. As other example, other configurations, such as power pole connectors, twist to fit connectors, coaxial connectors, and the like can be used with equal effectiveness.

The output from the central case enclosure 105 is provided on a first output cable 115, a second output cable 120, a third output cable 125, and/or a fourth output cable 130. In an example construction, the configurations presented by the output cables can include a USB configuration, a mini-USB configuration, a micro-USB configuration, or proprietary connections (e.g., as used by APPLE®, BLACKBERRY® or the like). The quantity and configuration of the first output cable 115, the second output cable 120, the third output cable 125, and the fourth output cable 130 can vary and, as such, are not intended to be a limiting factor. The low voltage adapter 100 allows use of the system 10 to be used to charge and/or operate small personal electronics when no other suitable source of power is present.

Figure 5:
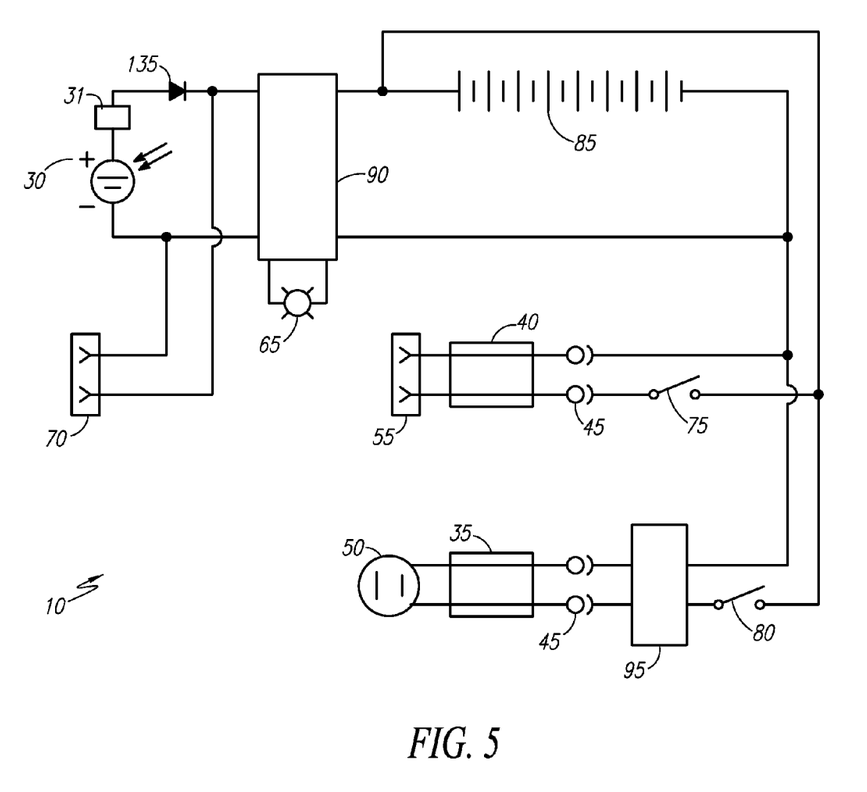

Referring to FIG. 5, output power from the photovoltaic panel 30 is conditioned using a step-up transformer 31 that boosts the output of the photovoltaic panel 30 to charge the battery 85 faster. The output power is delivered to the charge controller board 90. The auxiliary connection from the auxiliary 12-VDC charging input port 70 is connected in a parallel manner. A blocking diode 135 prevents damage to the photovoltaic panel 30 in the event the auxiliary 12-VDC charging input port 70 is being utilized. The charging status of the lithium ion storage batteries 85 is depicted by the charge indicator light 65 connected to monitoring circuitry of the charge controller board 90. The lithium ion storage batteries 85 are arranged to provide 12-VDC. Output from the lithium ion storage batteries 85 is routed through the 12-VDC control switch 75 and a spring load reel with slip rings 45 where it is passed onto the spring load reel with slip rings 45 via the 12-VDC retractable power cord 40. Additionally, 12-VDC is passed through the 120-VAC control switch 80 to the inverter board 95 that converts it into 120-VAC using known switching processes. The resultant output voltage is passed onto the 120-VAC power plug 50 via use of the 120-VAC retractable power cord 35 and another spring load reel with slip rings 45.

Those skilled in the art will recognize that other styles and configurations of the disclosed system 10 can be easily incorporated into the teachings of the present disclosure, and only particular configurations have been shown and described for purposes of clarity and disclosure and not by way of limitation of scope.

The disclosed embodiments of the system 10 can be utilized by the common user in a simple and effortless manner with little or no training After initial purchase or acquisition of the system 10, it would be installed as illustrated in FIGS. 1 and 2. The system 10 can be constructed in general accordance with FIGS. 1-5 and purchased as a completed unit by the final user.

Prior to use of the system 10 it would be initially charged. The charging is accomplished by placing the system 10 in direct sunlight and/or other high level illumination. Charging may also be accomplished by connecting a suitable source of 12-VDC power to the auxiliary 12-VDC charging input port 70. After a suitable period of time, depending on the amount of sunlight or input power, the charge controller board 90 will complete charging of the lithium ion storage batteries 85. This charging is verified by the observation of the charge indicator light 65. When completely charged, the system 10 is ready for use.

During use of the system 10, the user must first determine the output voltage necessary for the particular electrical load to be powered. Should 120-VAC be needed, the user would withdraw the 120-VAC retractable power cord 35 from the exterior case 15 using the respective spring load reel with slip rings 45. The load would be connected to the 120-VAC power plug 50. Finally, the 120-VAC control switch 80 would be activated to supply 12-VDC to the inverter board 95 that would provide 120-VAC through the 120-VAC retractable power cord 35.

Should 120-VDC be needed, the user would withdraw the 12-VDC retractable power cord 40 from the exterior case 15 using the respective spring load reel with slip rings 45. The load would be connected to the 12-VDC power plug 55. Finally, the 12-VDC control switch 75 would be activated to supply 12-VDC through the 120-VAC retractable power cord 35.

Should a lower voltage be needed to operate personnel electronics, the user would withdraw the 12-VDC retractable power cord 40 from the exterior case 15 using the respective spring load reel with slip rings 45. The user would then plug the 12-VDC input connector 110 of the low voltage adapter 100 into the 12-VDC power plug 55. Next, the electrical load would be connected to the first output cable 115, the second output cable 120, the third output cable 125, and/or the fourth output cable 130 as needed. Finally, the 12-VDC control switch 75 would be activated to supply 12-VDC through the 120-VAC retractable power cord 35 to the low voltage adapter 100.

The system 10 can be left in left in an illuminated location or connected to an auxiliary 12-VDC power source through the auxiliary 12-VDC charging input port 70 while the system 10 is provided output power on the 120-VAC retractable power cord 35 or the 12-VDC retractable power cord 40. After the need for the system 10 has passed, it can be recharged by either of the two (2) recharging methods described above and stored until needed again in a circular and repeating manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A portable photovoltaic electrical power system comprising:
   a photovoltaic panel;
   a battery bank electrically connected to said photovoltaic panel;
   a first spring load reel with slip rings electrically connected to said battery bank and said photovoltaic panel;
   a second spring load reel with slip rings electrically connected to said battery bank and said photovoltaic panel;
   a 12-VDC retractable power cord electrically connected to said first spring load reel with slip rings and wound around said first spring load reel with slip rings;
   a 120-VAC retractable power cord electrically connected to said second spring load reel with slip rings and wound around said second spring load reel with slip rings;
   a step up transformer electrically connected to said photovoltaic panel and said first spring load reel with slip rings and said photovoltaic panel and said second spring load reel with slip rings;
   a 12-VDC control switch electrically connected to said battery bank and said first spring load reel with slip rings; and
   a 120-VAC control switch electrically connected to said battery bank and said second spring load reel with slip rings.

2. The system of claim 1, wherein said 12-VDC retractable cord comprises a 12-VDC power plug; and wherein said system further comprises a low voltage adapter removably electrically connected to said 12-VDC power plug, said low voltage adapter comprising:
   a central case enclosure;
   a solid state voltage reduction circuit; and,
   a plurality of output cables, each output cable comprising a low voltage connector.

3. The system of claim 1, further comprising:
   a step up transformer electrically connected to said photovoltaic panel and said battery bank;
   a charge controller board electrically connected to said step up transformer and said battery bank; and,
   a charge indicator light electrically connected to said charge controller.

4. The system of claim 1, further comprising:
   an auxiliary 12-VDC charging port electrically connected to said battery bank;
   a charge controller board electrically interconnected between said auxiliary 12-VDC charging port and said battery bank; and,
   a charge indicator light electrically connected to said charge controller.

5. The system of claim 1, further comprising
   an exterior case defining an internal space;

wherein said first and second spring load reel with slip rings are disposed within said internal space and operatively connected to said exterior case.

6. The system of claim 1, further comprising an inverter board electrically connected to said 120-VAC retractable power cord electrically and said battery bank.

7. The system of claim 1, further comprising an exterior case comprising a front surface and an opposed back surface, wherein said photovoltaic panel defines substantially all of said front surface, and wherein said battery bank is disposed within an interior of said exterior case.

8. The system of claim 7, wherein said exterior case further comprises a plurality of support feet to orient said photovoltaic panel in a substantially vertical position.

9. The system of claim 7, wherein said exterior case further comprises a plurality of bumpers connected to said back surface to orient said photovoltaic panel in a substantially horizontal position.

10. The system of claim 7, wherein said exterior case further comprises a leg pivotably connected to said back surface to orient said photovoltaic panel at a non-zero angle relative to vertical.

11. A portable photovoltaic electrical power system comprising:
an exterior case defining an internal space;
a photovoltaic panel coupled to said exterior case;
a battery bank electrically connected to said photovoltaic panel;
a first spring load reel with slip rings disposed within said internal space and operatively connected to said exterior case and electrically connected to said battery bank and said photovoltaic panel;
a second spring load reel with slip rings disposed within said internal space and operatively connected to said exterior case and electrically connected to said battery bank and said photovoltaic panel;
a 12-VDC retractable power cord electrically connected to said first spring load reel with slip rings and wound around said first spring load reel with slip rings;
a 120-VAC retractable power cord electrically connected to said second spring load reel with slip rings and wound around said second spring load reel with slip rings;
a step up transformer electrically connected to said photovoltaic panel and said first spring load reel with slip rings and said photovoltaic panel and said second spring load reel with slip rings;
a 12-VDC control switch electrically connected to said battery bank and said first spring load reel with slip rings; and
a 120-VAC control switch electrically connected to said battery bank and said second spring load reel with slip rings.

12. The system of claim 11, further comprising:
a low voltage adapter removably electrically connected to said 12-VDC retractable power cord, said low voltage adapter comprising:
a central case enclosure;
a solid state voltage reduction circuit; and,
a plurality of output cables, each output cable comprising a low voltage connector.

13. The system of claim 11, wherein said exterior case comprises a front surface and an opposed back surface, wherein said photovoltaic panel defines substantially all of said front surface, and wherein said battery bank is disposed within said internal space.

14. The system of claim 13, wherein said exterior case further comprises at least one of:
a plurality of support feet to orient said photovoltaic panel in a substantially vertical position;
a plurality of bumpers connected to said back surface to orient said photovoltaic panel in a substantially horizontal position; and,
a leg pivotably connected to said back surface to orient said photovoltaic panel at a non-zero angle relative to vertical.

15. The system of claim 11, further comprising:
a charge controller board electrically connected to said step up transformer and said battery bank; and,
a charge indicator light electrically connected to said charge controller.

16. The system of claim 15, further comprising an auxiliary 12-VDC charging port electrically connected to said battery bank and said charge controller board.

17. A portable photovoltaic electrical power system comprising:
an exterior case comprising a front surface and an opposed rear surface and defining an internal space;
a handle connected to an upper end of said exterior case;
a photovoltaic panel defining substantially all of said front surface;
an auxiliary 12-VDC charging port;
a plurality of support feet connected to a lower end of said exterior case to orient said photovoltaic panel in a substantially vertical position;
a plurality of bumpers connected to said back surface to orient said photovoltaic panel in a substantially horizontal position;
a leg pivotably connected to said back surface to orient said photovoltaic panel at a non-zero angle relative to vertical;
a battery bank comprising a plurality of lithium ion storage batteries electrically connected to said photovoltaic panel and said auxiliary 12-VDC charging port;
a first spring load reel with slip rings disposed within said internal space and operatively connected to said exterior case and electrically connected to said battery bank, said photovoltaic panel, and said auxiliary 12-VDC charging port;
a second spring load reel with slip rings disposed within said internal space and operatively connected to said exterior case and electrically connected to said battery bank, said photovoltaic panel, and said auxiliary 12-VDC charging port;
a 12-VDC retractable power cord electrically connected to said first spring load reel with slip rings and wound around said first spring load reel with slip rings, said 12-VDC retractable cord comprising a 12-VDC power plug;
a 120-VAC retractable power cord electrically connected to said second spring load reel with slip rings and wound around said second spring load reel with slip rings, said 120-VAC retractable cord comprising a 120-VAC power plug;
a step up transformer electrically connected to:
said photovoltaic panel and said battery bank;
said photovoltaic panel and said first spring load reel with slip rings; and,
said photovoltaic panel and said second spring load reel with slip rings;
a charge controller board electrically connected to:
said step up transformer and said battery bank;

said step up transformer and said first spring load reel with slip rings;

said step up transformer and said second spring load reel with slip rings;

said auxiliary 12-VDC charging port and said first spring load reel with slip rings; and, said auxiliary 12-VDC charging port and said second spring load reel with slip rings;

a charge indicator light electrically connected to said charge controller;

an inverter board electrically connected to said battery bank and said second spring load reel with slip rings;

a blocking diode electrically connected to said photovoltaic panel and said auxiliary 12-VDC charging port;

a 12-VDC control switch electrically connected to said battery bank and said first spring load reel with slip rings;

a 120-VAC control switch electrically connected to said battery bank and said second spring load reel with slip rings, and, a low voltage adapter removably electrically connected to said 12-VDC power plug, said low voltage adapter comprising:

a central case enclosure;

a solid state voltage reduction circuit; and, a plurality of output cables, each output cable comprising a low voltage connector.

* * * * *